(12) United States Patent
Wang

(10) Patent No.: US 12,332,694 B2
(45) Date of Patent: Jun. 17, 2025

(54) FOLDABLE DISPLAY DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 0 days.

(21) Appl. No.: 17/618,568

(22) PCT Filed: Nov. 23, 2021

(86) PCT No.: PCT/CN2021/132356
§ 371 (c)(1),
(2) Date: May 11, 2023

(87) PCT Pub. No.: WO2023/077566
PCT Pub. Date: May 11, 2023

(65) Prior Publication Data
US 2024/0061469 A1    Feb. 22, 2024

(30) Foreign Application Priority Data
Nov. 5, 2021    (CN) .......................... 202111307429.1

(51) Int. Cl.
*G06F 1/16* (2006.01)
(52) U.S. Cl.
CPC .................................. *G06F 1/1652* (2013.01)
(58) Field of Classification Search
CPC .... G06F 1/1652; G06F 1/1681; G06F 1/1641; G06F 1/1616; G06F 1/1618; G06F 1/1643; G06F 1/1647; G06F 1/1677; G06F 1/1679; H05K 5/0017; H05K 5/0226; H05K 5/028; H05K 5/0086; H05K 5/021; H05K 5/15
See application file for complete search history.

(56) References Cited

U.S. PATENT DOCUMENTS

| | | | |
|---|---|---|---|
| 10,838,458 B1* | 11/2020 | Park | G06F 1/1618 |
| 11,044,825 B1* | 6/2021 | Han | H05K 5/0017 |
| 2014/0111954 A1* | 4/2014 | Lee | H04M 1/0268 |
| | | | 361/749 |

(Continued)

FOREIGN PATENT DOCUMENTS

| | | |
|---|---|---|
| CN | 106373490 A | 2/2017 |
| CN | 209232312 U | 8/2019 |

(Continued)

*Primary Examiner* — Abhishek M Rathod
(74) *Attorney, Agent, or Firm* — Nathan & Associates Patent Agents Ltd.; Menachem Nathan

(57) ABSTRACT

Disclosed is a foldable display device, comprising a first support plate, a second support plate, a bending member and a flexible display panel. The second supporting plate comprises a flat support part, a curved support part and a protective plate which are connected. The curved support part is located at one end of the flat support part away from the first support plate. One end of the flexible display panel wraps around the curved support part and extends to an other side of the second support plate, and penetrates a gap between a cover plate and the curved support part to avoid scratches and wear.

16 Claims, 6 Drawing Sheets

(56) References Cited

U.S. PATENT DOCUMENTS

| | | | | |
|---|---|---|---|---|
| 2015/0062927 A1* | 3/2015 | Hirakata | ............ | H01F 1/14791 |
| | | | | 362/362 |
| 2017/0025634 A1* | 1/2017 | Jeong | .................. | H10K 77/111 |
| 2020/0356145 A1 | 11/2020 | Choi | | |
| 2021/0150944 A1 | 5/2021 | Yoon et al. | | |
| 2021/0173438 A1* | 6/2021 | Lee | ....................... | G06F 1/1652 |
| 2021/0360799 A1* | 11/2021 | Jia | ........................... | G09F 9/301 |

FOREIGN PATENT DOCUMENTS

| | | | |
|---|---|---|---|
| CN | 110459131 | A | 11/2019 |
| CN | 111261049 | A | 6/2020 |
| CN | 112929468 | A | 6/2021 |
| CN | 213424445 | U | 6/2021 |
| CN | 113066381 | A | 7/2021 |
| WO | 2016048113 | A1 | 3/2016 |
| WO | 2018186631 | A1 | 10/2018 |

* cited by examiner

FOLDABLE DISPLAY DEVICE

FIELD OF THE INVENTION

The present application relates to a display technology field, and more particularly to a foldable display device.

BACKGROUND OF THE INVENTION

In order to realize independent display in the unfolded and folded states, the existing foldable display device usually adopts the design of main and secondary dual screens, that is, adopts two independent screens. A large screen is employed as the main screen to display the mobile phone in the unfolded state, and a small screen is employed as the secondary screen to display in the folded state. The secondary screen usually adopts a straight screen. There is a certain installation space between the straight screen and the edge of the middle frame. It is necessary to design a corresponding front frame for fixing, and it is necessary to arrange a protective glass with an ink frame for decoration. Such design will undoubtedly sacrifice the display space of the secondary screen, resulting in the secondary screen of the foldable display device being relatively narrow and long in the folded state, which is not conducive to achieving a high screen-to-body ratio of the whole machine and affects the overall appearance.

The embodiment of the present application provides a foldable display device to solve the technical problem that the existing foldable display device adopts a main and secondary dual-screen design, which is not conducive to achieving a high screen-to-body ratio of the whole machine.

SUMMARY OF THE INVENTION

To solve the aforesaid problem, the technical solution of the present application is described as follows:
the present application provides a foldable display device, comprising:
a first support plate;
a second support plate, comprising a flat support part, a curved support part and a protective plate, and the curved support part is located at an end of the flat support part away from the first support plate and connected to the flat support part; and the protective plate is located at an end of the curved support part away from the first support plate, and the protective plate and the curved support part have a gap left inbetween and are connected to each other, and an orthographic projection of the protective plate on the curved support part covers a bending axis of the curved support part, and the protective plate is made of transparent material;
a bending member, and the first support plate and the second support plate are rotatably connected by the bending member; and
a flexible display panel, laid on one side of the first support plate, the second support plate and the bending member, and one end of the flexible display panel wraps around the curved support part and extends to an other side of the second support plate, and the flexible display panel penetrates the gap.

According to the foldable display device provided by the present application, in a direction perpendicular to a plane of the first support plate, a cross-sectional shape of the curved support part is an arc, and a cross-sectional area of the protective plate is $\frac{1}{5}$ to $\frac{1}{6}$ of a circle area of the cross-sectional shape of the curved support part.

According to the foldable display device provided by the present application, the second support plate further comprises a first extension part and a second extension part for connecting the curved support part and the protective plate, and the first extension part and the second extension part are formed by extending the flat support part in a direction away from the first support plate; wherein one end of the protective plate is connected to the first extension part, and an other end of the protective plate is connected to the second extension part.

According to the foldable display device provided by the present application, the first extension part, the second extension part and the protective plate are integrally formed with the flat support part.

According to the foldable display device provided by the present application, the foldable display device further comprises a front frame, and the front frame is arranged on a side of the flexible display panel away from the first support plate and the second support plate and covers at least a part of a side surface of the flexible display panel, and the front frame comprises a first front frame and a second front frame, and the first front frame is connected to the first support plate, and the second front frame is connected to the second support plate, and the second front frame comprises a front part and a side part, and the front part is connected to the second support plate, the side part is connected to the first extension part and the second extension part, and the side part is a curved surface.

According to the foldable display device provided by the present application, the flexible display panel comprises:
a first display area, laid on the one side of the first support plate;
a second display area, laid on the one side of the flat support part;
a first bending display area, laid on the one side of the bending member;
a third display area, laid on one side of the second support plate away from the second display area; and
a second bending display area, laid on the curved support part and fixedly connected to the curved support part.

According to the foldable display device provided by the present application, the protective plate comprises a first lap jointing end surface and a second lap jointing end surface that are arranged oppositely, and the first lap jointing end surface is located on a side of the protective plate close to the second display area, and the second lap jointing end surface is located on a side of the protective plate close to the third display area;
the foldable display device further comprises a first cover plate and a second cover plate, and the first cover plate covers the first display area, the second display area and a part of the second bending display area, and the second cover plate covers the third display area and a part of the second bending display area, and the first cover plate is lap jointed with the first lap jointing end surface and the second cover plate is lap jointed with the second lap jointing end surface.

The present application provides a foldable display device, comprising:
a first support plate;
a second support plate, comprising a flat support part, a curved support part and a protective plate, and the curved support part is located at an end of the flat support part away from the first support plate and connected to the flat support part; and the protective plate is located at an end of the curved support part away from the first support plate, and the protective plate and the curved support part have a gap left inbetween and are connected to each other;

a bending member, and the first support plate and the second support plate are rotatably connected by the bending member; and a flexible display panel, laid on one side of the first support plate, the second support plate and the bending member, and one end of the flexible display panel wraps around the curved support part and extends to an other side of the second support plate, and the flexible display panel penetrates the gap.

According to the foldable display device provided by the present application, an orthographic projection of the protective plate on the curved support part covers a bending axis of the curved support part.

According to the foldable display device provided by the present application, in a direction perpendicular to a plane of the first support plate, a cross-sectional shape of the curved support part is an arc, and a cross-sectional area of the protective plate is ⅕ to ⅙ of a circle area of the cross-sectional shape of the curved support part.

According to the foldable display device provided by the present application, the second support plate further comprises a first extension part and a second extension part for connecting the curved support part and the protective plate, and the first extension part and the second extension part are formed by extending the flat support part in a direction away from the first support plate; wherein one end of the protective plate is connected to the first extension part, and an other end of the protective plate is connected to the second extension part.

According to the foldable display device provided by the present application, the first extension part, the second extension part and the protective plate are integrally formed with the flat support part.

According to the foldable display device provided by the present application, the foldable display device further comprises a front frame, and the front frame is arranged on a side of the flexible display panel away from the first support plate and the second support plate and covers at least a part of a side surface of the flexible display panel, and the front frame comprises a first front frame and a second front frame, and the first front frame is connected to the first support plate, and the second front frame is connected to the second support plate, and the second front frame comprises a front part and a side part, and the front part is connected to the second support plate, the side part is connected to the first extension part and the second extension part, and the side part is a curved surface.

According to the foldable display device provided by the present application, the protective plate is made of transparent material.

According to the foldable display device provided by the present application, the flexible display panel comprises:

a first display area, laid on the one side of the first support plate;

a second display area, laid on the one side of the flat support part;

a first bending display area, laid on the one side of the bending member;

a third display area, laid on one side of the second support plate away from the second display area; and a second bending display area, laid on the curved support part and fixedly connected to the curved support part.

According to the foldable display device provided by the present application, the protective plate comprises a first lap jointing end surface and a second lap jointing end surface that are arranged oppositely, and the first lap jointing end surface is located on a side of the protective plate close to the second display area, and the second lap jointing end surface is located on a side of the protective plate close to the third display area;

the foldable display device further comprises a first cover plate and a second cover plate, and the first cover plate covers the first display area, the second display area and a part of the second bending display area, and the second cover plate covers the third display area and a part of the second bending display area, and the first cover plate is lap jointed with the first lap jointing end surface and the second cover plate is lap jointed with the second lap jointing end surface.

According to the foldable display device provided by the present application, the first cover plate comprises a first flat cover plate and a first curved cover plate that are connected to each other, and the first flat cover plate covers the first display area and the second display area, and the first curved cover plate covers the part of the second bending display area; the second cover plate comprises a second flat cover plate and a second curved cover plate that are connected to each other, the second flat cover plate covers the third display area, and the second curved cover plate covers the part of the second curved cover plate;

wherein the first curved cover plate is lap jointed with the first lap jointing end surface and the second curved cover plate is lap jointed with the second lap jointing end surface.

According to the foldable display device provided by the present application, when the foldable display device is in a folded state, the first display area, the second display area and the first bending display area are enclosed in a wedge shape, and the second display area, the third display area and the second bending display area are enclosed in a U shape.

According to the foldable display device provided by the present application, the bending member comprises a hinge mechanism, two side plates and a bottom plate, and the two side plates and the bottom plate are respectively connected with the hinge mechanism; the two side plates are respectively located on both sides of the hinge mechanism, and the bottom plate is located on a side of the hinge mechanism away from the flexible display panel.

According to the foldable display device provided by the present application, the second support plate comprises a first side frame, a second side frame, a third side frame and a fourth side frame that are connected end to end, and the first side frame and the third side frame are arranged opposite to each other, and the second side frame and the fourth side frame are arranged opposite to each other; the first side frame forms the curved support part, and the second side frame, the third side frame and the fourth side frame enclose to form the flat support part.

The benefits of the present application are: the foldable display device provided by the present application comprises a first support plate, a second support plate, a bending member and a flexible display panel. The first support plate and the second support plate are rotatably connected by the bending member such that the flexible display panel can be dynamically bent in the form of inward folding through the bending member; the second support plate comprises a flat support part, a curved support part and a protective plate. One end of the flexible display panel wraps around the curved support part and extends to an other side of the second support plate such that the flexible display panel can achieve static bending in the form of outward folding for realizing the curved edge display; meanwhile, the flexible display panel penetrates the gap between the protective plate and the curved support part to protect the flexible display panel laid on the curved support part and to avoid that the flexible display panel is directly exposed to the outside and increases the risk of scratches and wear.

BRIEF DESCRIPTION OF THE DRAWINGS

In order to more clearly illustrate the embodiments of the present application and the prior art, the following figures will be described in the embodiments and the prior art are briefly introduced. It is obvious that the drawings are only some embodiments of the present application, those of ordinary skill in this field can obtain other figures according to these figures without paying the premise.

Figure 1:
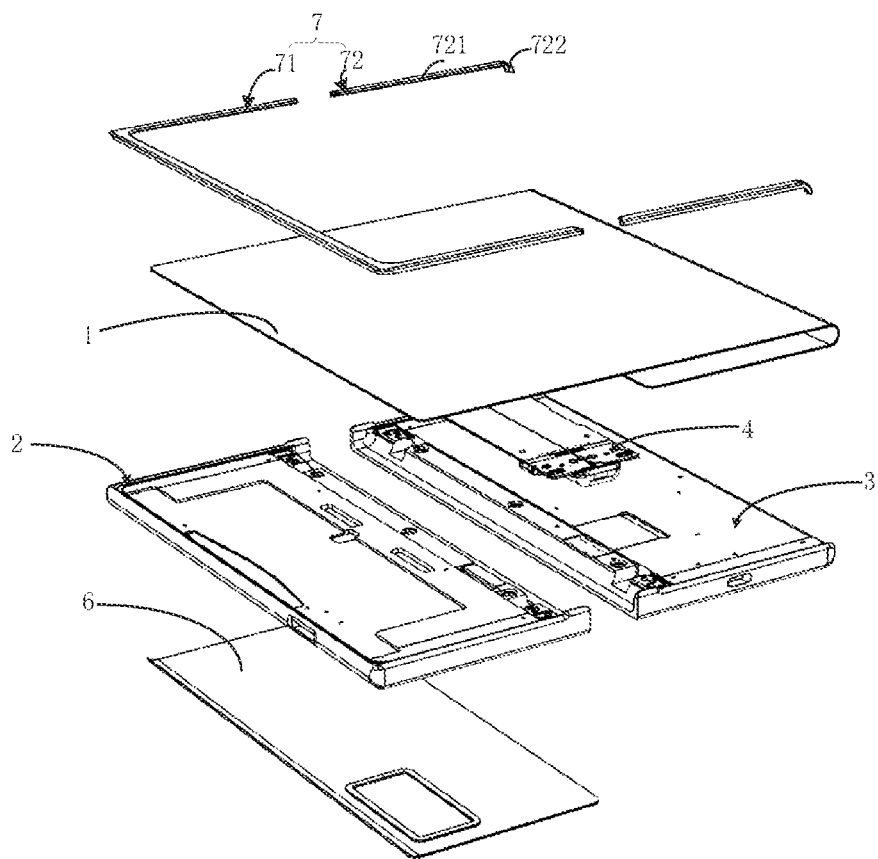
FIG. 1 is an exploded structure diagram of a foldable display device provided by an embodiment of the present application.

REFERENCE NUMERALS 1. flexible display panel; 2. first support plate; 3. second support plate; 4. bending member; 5. first cover plate; 6. second cover plate; 7. front frame;
11. first display area; 12. second display area; 13. third display area; 14. first bending display area; 15. second bending display area; 151. main bending display area; 152. secondary bending display area;
31. flat support part; 32. Curved support part; 321. bending axis; 33. protective plate; 331. first lap joint end surface; 332. second lap joint end surface; 3a. first side frame; 311. outer edge line; 3b. second side frame; 3c. third side frame; 3d. fourth side frame; 36. first extension part; 37. the second extension part;
41. hinge mechanism; 42. side plate; 43. bottom plate;
51. first flat cover plate; 52. first curved cover plate;
6. second cover plate; 61. second flat cover plate; 62. second curved cover plate;
71. first front frame; 72. second front frame; 721. front part; 722. side part.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper" and "lower" usually refer to the upper and lower of the device in actual use or working state, which specifically are the directions of the drawing in the figures; and "inner" and "outer" refer to the outline of the device.

Figure 2:
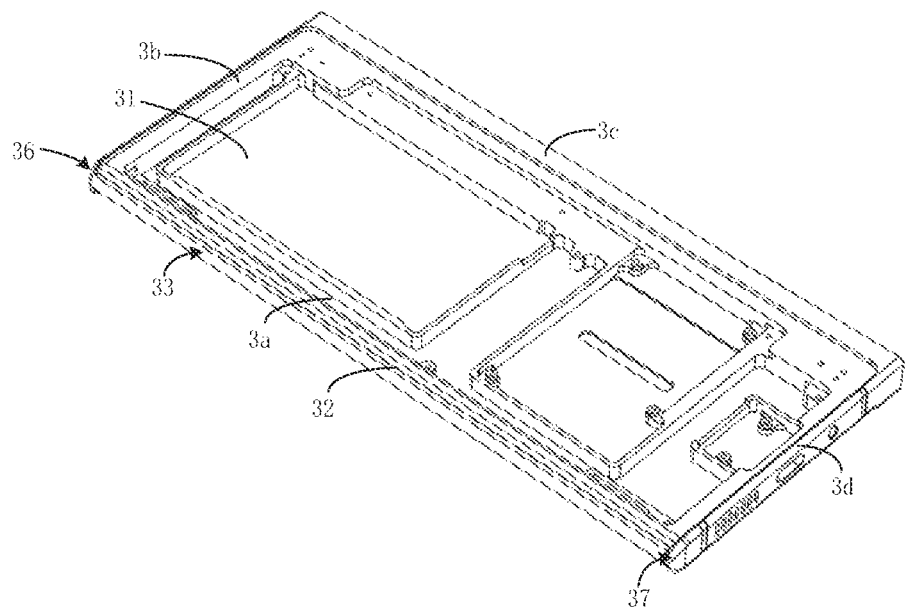
FIG. 2 is a structural diagram of a second support plate provided by an embodiment of the present application.
Figure 3:
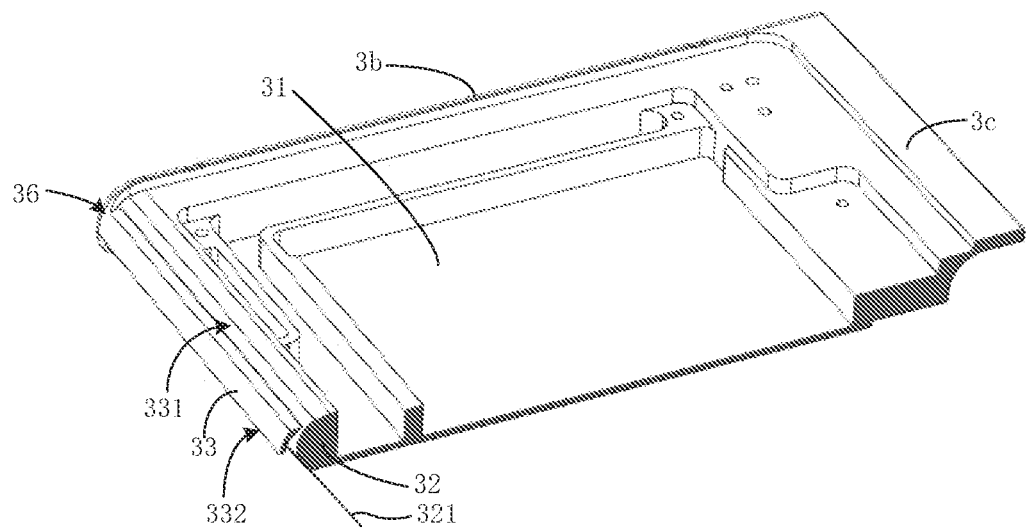
FIG. 3 is a partial structural diagram of the second support plate in FIG. 2.

Please refer to FIG. 1 to FIG. 3. FIG. 1 is an exploded structure diagram of a foldable display device provided by an embodiment of the present application; FIG. 2 is a structural diagram of a second support plate provided by an embodiment of the present application; FIG. 3 is a partial structural diagram of the second support plate in FIG. 2; the present application provides a foldable display device, and the foldable display device comprises a flexible display panel 1, a first support plate 2, a second support plate 3 and a bending member 4.

Specifically, the second support plate 3 comprises a flat support part 31, a curved support part 32 and a protective plate 33, and the curved support part 32 is located at an end of the flat support part 31 away from the first support plate 2 and connected to the flat support part 31; and the protective plate 33 is located at an end of the curved support part 32 away from the first support plate 2, and the protective plate 33 and the curved support part 32 have a gap left inbetween and are connected to each other.

The bending member 4 is located between the first support plate 2 and the second support plate 3 and connects the first support plate 2 and the second support plate 3. The first support plate 2 and the second support plate 3 are rotatably connected by the bending member 4 to realize the dynamic bending in the form of inward folding.

The flexible display panel 1 is laid on one side of the first support plate 2, the second support plate 3 and the bending member 4, and one end of the flexible display panel 1 wraps around the curved support part 32 and extends to the other side of the second support plate 3, and the flexible display panel 1 penetrates the gap. On one hand, the curved support part 32 can achieve static bending in the form of outward folding for the flexible display panel 1; on the other hand, the protective plate 33 can protect the flexible display panel 1 laid on the curved support part 32 and avoid that the flexible display panel 1 is directly exposed to the outside and increases the risk of scratches and wear.

Figure 4A:
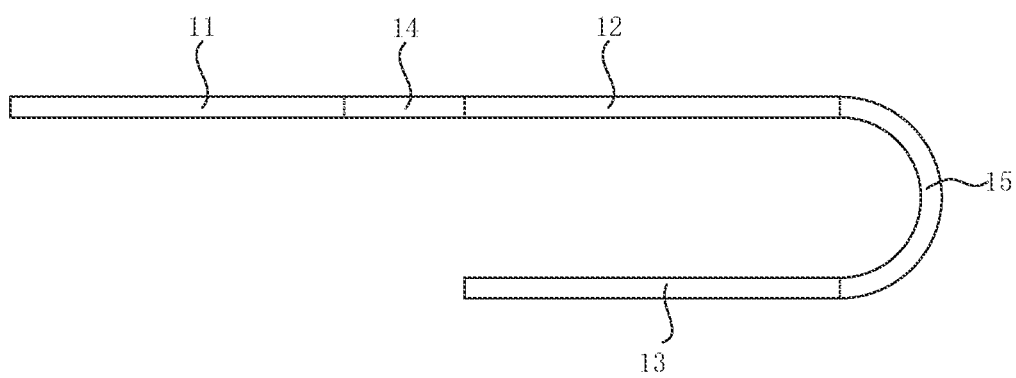
FIG. 4A is a structural diagram of a flexible display panel in an unfolded state provided by an embodiment of the present application.
Figure 4B:
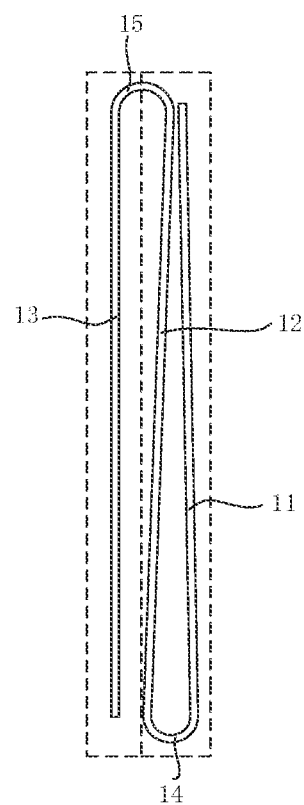
FIG. 4B is a structural diagram of a flexible display panel in a folded state provided by an embodiment of the present application.

Please refer to FIG. 4A to FIG. 4B. FIG. 4A is a structural diagram of a flexible display panel in an unfolded state provided by an embodiment of the present application; FIG.

4B is a structural diagram of a flexible display panel in a folded state provided by an embodiment of the present application.

The flexible display panel 1 comprises a first display area 11, a second display area 12, a third display area 13, a first bending display area 14 and a second bending display area 15; the first display area 11 is laid on the one side of the first support plate 2, and the second display area 12 is laid on the one side of the flat support part 31, and the first bending display area 14 is laid on the one side of the bending member 4, and the third display area 13 is laid on one side of the second support plate 3 away from the second display area 12, and the second bending display area 15 is laid on the curved support part 32 and fixedly connected to the curved support part 32.

As shown in FIG. 4, when the foldable display device is in an unfolded state, the third display area 13 is statically bent in the form of outward folding through the second bending display area 15, and the first display area 11, the second display area 12 and the first bending display area 14 are located on the same plane. Since the second bending display area 15 in the present application is a curved surface and can display, the first display area 11, the second display area 12, the first bending display area 14 and a part of the second bending display area 15 can be employed as the main screen of the foldable display device for screen display.

As shown in FIG. 4B, when the foldable display device is in a folded state, the first bending display area 14 is in a bent state. The first display area 11 and the second display area 12 are dynamically bent in the form of inward folding through the first bending display area 14, so that the display surface of the first display area 11 and the display surface of the second display area 12 face each other, and the first display area 11, the second display area 12, and the first bending display area 14 do not display. Similarly, the third display area 13 and a part of the second bending display area 15 may be employed as the secondary screen of the foldable display device for screen display. Compared with the foldable display device of the prior art that utilized a straight screen as the secondary screen, The secondary screen in the present application can realize a curved edge display, which enables the secondary screen to have a more coordinated aspect ratio and a wider display range, which is beneficial to increase the overall screen-to-body ratio of the secondary screen.

It is understandable that compared with the existing foldable display device that adopts two screens as the main screen and the secondary screen respectively, the entire foldable display device employs only one flexible display panel 1, and divides the flexible display panel 1 into two parts as the main screen and the secondary screen, which can meet the requirements of separate display of the main and secondary screens of the foldable display device, thereby achieving the purpose of dual use and sharing of one screen.

Furthermore, when the foldable display device is in a folded state, the first display area 11, the second display area 12 and the first bending display area 14 are enclosed in a wedge shape, and the second display area 12, the third display area 13 and the second bending display area 15 are enclosed in a U shape. Therefore, the overall structure of the foldable display device is more compact, and the overall thickness is lighter and thinner.

Figure 5A:
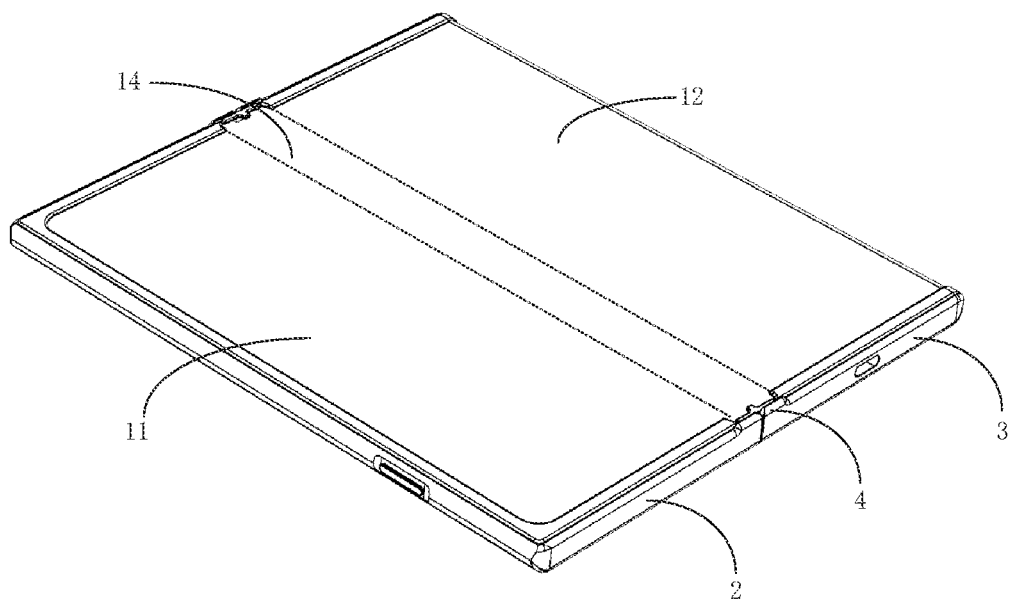
FIG. 5A is a top view structural diagram of a foldable display device in an unfolded state provided by an embodiment of the present application.
Figure 5B:
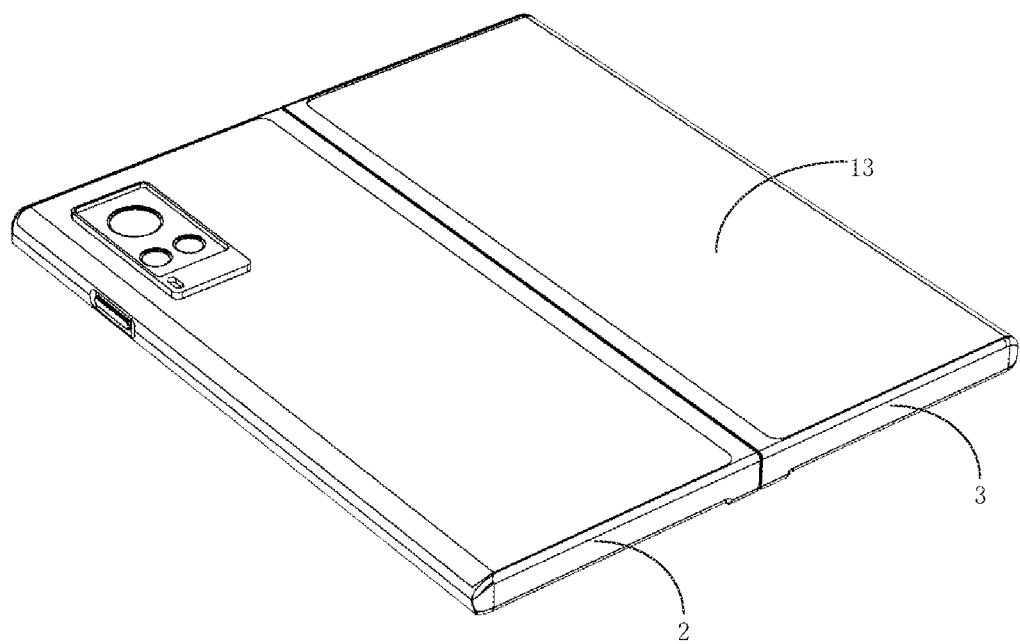
FIG. 5B is a bottom view structural diagram of a foldable display device in an unfolded state provided by an embodiment of the present application.
Figure 5C:
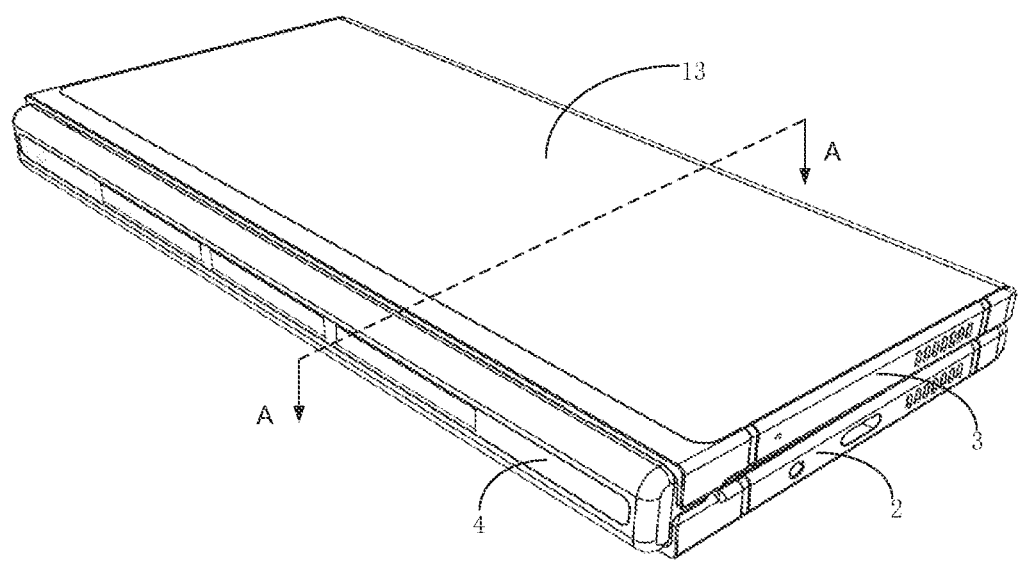
FIG. 5C is a structural diagram of a foldable display device in a folded state provided by an embodiment of the present application.

Please combine FIG. 1 and FIG. 5A to FIG. 5C, and FIG. 5A is a top view structural diagram of a foldable display device in an unfolded state provided by an embodiment of the present application; FIG. 5B is a bottom view structural diagram of a foldable display device in an unfolded state provided by an embodiment of the present application; FIG. 5C is a structural diagram of a foldable display device in a folded state provided by an embodiment of the present application.

Specifically, the first support plate 2 is provided corresponding to the first display area 11, and is employed to support the first display area 11; the second support plate 3 is provided corresponding to the second display area 12, the second bending display area 15 and the third display area 13, and is employed to support the second display area 12, the third display area 13 and the second bending display area 15; the bending member 4 is provided corresponding to the first bending display area 14, and when the foldable display device is in an unfolded state, the bending member 4 is employed to support the first bending display area 14.

Please refer to FIG. 5A and FIG. 5B. When the foldable display device is in an unfolded state, the surface of the bending member 4 facing the first bending display area 14 and the surfaces of the first support plate 2 and the second support plate 3 facing the first display area 11 and the second display area 12 are coplanar to form a support plane of the flexible display panel 1.

Please refer to FIG. 5C. When the foldable display device is in a folded state, the first display area 11 is attached to the inner side of the first support plate 2, the second display area 12 is attached to the inner side of the second support plate 3, and the first bending display area 14 is attached to the inner side of the inside of the bending member 4, and the third display area 13 and the second support plate 3 are assembled into one body. When the whole foldable display device is not in use, the first display area 11, the second display area 12 and the first bending display area can be stored in the accommodating space formed inside the first support plate 2, the second support plate 3 and the bending member 4 such that the main screen can be better stored and protected.

It is understandable that compared with the traditional foldable display device with two independent screens as the main screen and the secondary screen and the secondary screen adopts the design of a straight screen, only one piece of the flexible display panel 1 can be employed to achieve the effect of separate display of the main and secondary screens in this application. The secondary screen body and the edge of the second support plate 3 do not need to reserve the installation space of the front frame, which can save the space of the thickness dimension of the second support plate 3, which is conducive to the light and thin design of the whole machine, so that the foldable display device possesses better foldable performance and is convenient for storage and carrying.

Specifically, the flexible display panel 1 is flexible and bendable at least in an area corresponding to the bending member 4 and a side of the second support plate 3 away from the first support plate 2. The flexible display panel 1 may be an organic light emitting diode display panel, or may be a display panel with flexibility in other forms.

Please continue to refer to FIG. 2 and FIG. 3. the second support plate 3 comprises a first side frame 3*a*, a second side frame 3*b*, a third side frame 3*c* and a fourth side frame 3*d* that are connected end to end, and an area enclosed by the first side frame 3*a*, the second side frame 3*b*, the third side frame 3*c* and the fourth side frame 3*d* are employed to support the second display area 12 and the third display area 13. the first side frame 3*a* and the third side frame 3*c* are arranged opposite to each other and the second side frame 3*b* and the fourth side frame 3*d* are arranged opposite to each other; the first side frame 3*a* forms the curved support part 32, and the second side frame 3b, the third side frame 3c and the fourth side frame 3d enclose to form the flat support part 31.

The second support plate 3 further comprises a first extension part 36 and a second extension part 37 for connecting the curved support part 32 and the protective plate 33, and the first extension part 36 and the second extension part 37 are formed by extending the flat support part in a direction away from the first support plate 2. Specifically, the first extension part 36 is formed by extending the second side frame 3b in a direction away from the first support plate 2. The second extension part 37 is formed by extending the fourth side frame 3d in a direction away from the first support plate 2; the first extension part 36 and the second extension part 37 may be curved surfaces.

The protective plate 33 is located on the side of the first side frame 3a away from the third side frame 3c. One end of the protective plate 33 is connected to the first extension part 36, and the other end of the protective plate 33 is connected to the second extension part 37. The protective plate 33 and the first side frame 3a have a gap left inbetween, and the flexible display panel 1 penetrates the gap. The protective plate 33 can protect the second bending display area 15 and avoid that the screen body of the second bending display area 15 is directly exposed to the outside and increases the risk of scratches and wear.

Specifically, the assembly process of the flexible display panel 1 with the first support plate 2, the second support plate 3 and the bending member 4 is as follows: first, the first display area 11, the second display area 12 and the first bending display area 14 of the flexible display panel 1 are attached to the first support plate 2, the second support plate 3 and the bending member 4, respectively to form a composite form; then, the flexible display panel 1 is folded in a reverse direction, and the flexible display panel 1 directly penetrates the gap, so that the second bending display area 15 is attached to the first side frame 3a; finally, the third display area 13 is attached to a side of the second support plate 3 away from the second display area 12.

Figure 6:
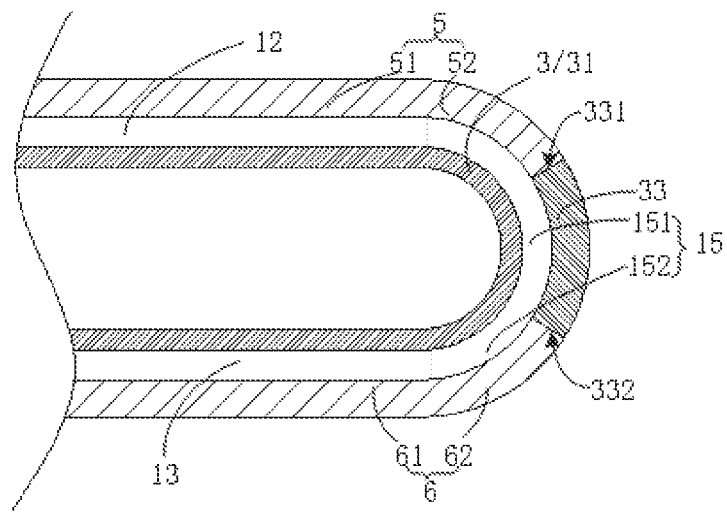
FIG. 6 is a structural diagram of the foldable display device in FIG. 5C along A-A cross-section.

Please combine FIG. 1 to FIG. 3, FIG. 5C and FIG. 6. FIG. 6 is a structural diagram of the foldable display device in FIG. 5C along A-A cross-section.

The curved support part 32 comprises a bending axis 321. The bending axis 321 is an outer edge line along a direction parallel to an extending direction of the first side frame 3a. A projection of the bending axis 321 on the first side frame 3a coincides with the outer edge line 311. Since the bending axis 321 has the greatest chance of being scratched or worn, an orthographic projection of the protective plate 33 on the curved support part 32 covers the bending axis 321 of the curved support portion 32. It is beneficial to reduce the probability of scratching and wearing of the second bending display area 15.

In the embodiment of the present application, in a direction perpendicular to a plane of the first support plate 2, a cross-sectional shape of the curved support part 32 is an arc, and a cross-sectional area of the protective plate 33 is $1/5$ to $1/6$ of a circle area of the cross-sectional shape of the curved support part 32; the purpose of this arrangement is: on one hand, it is avoided that the protective plate 33 is too large so that the area of the second bent display area 15 that is shielded by the protective plate 33 is larger, which leads to a reduction in the display area of the second bending display area 15 and reduces the overall screen-to-body ratio of the flexible display panel 1; on the other hand, it is prevented that the protective plate 33 is too small so that the area of the second bending display area 15 which is susceptible to scratches and wear is not completely shielded by the protective plate 33, which increases the probability of damage to the second bending display area 15.

The protective plate 33 can serve as a dividing line between the main screen and the secondary screen of the foldable display device, and the protective plate 33 divides the second bending display area 15 into two. Specifically, the second bending display area 15 comprises a main bending display area 151 and an auxiliary bending display area 152. The main bending display area 151 is an area of the second bending display area 15 close to the second display area 12 and can be employed as a part of the display area of the main screen. The auxiliary bending display area is an area of the second bending display area 15 close to the third display area 13 and can be employed as a part of the display area of the secondary screen. Therefore, the phenomenon of structural level difference in the position of the boundary between the inner and outer edges of the foldable display device is avoided, which is beneficial to improve the overall viewing quality of the secondary screen.

Furthermore, the foldable display device further comprises a screen display driving system (not shown in the figure) for achieving the effect of free switching between the two display states of the flexible display panel. Specifically, the screen display driving system comprises a first driving module and a second driving module. When the foldable display device is in the unfolded state, the first driving module drives the first display area 11, the second display area 12, the first bending display area 14 and the main bending display area 151 to realize the main screen display; when the foldable display device is in the folded state, the second driving module drives the third display area 13 and the auxiliary bending display area 152 to realize the secondary screen display.

Specifically, the screen display driving system may be a driving chip, and the first driving module that controls the main screen display and the second driving module that controls the secondary screen display are integrated in the same driving chip. Namely, the foldable display device only needs to set one driving chip to control the two display states of the flexible display panel. Compared to the prior art, the main screen and the secondary screen adopt an integrated screen body, which reduces the design difficulty of the driving system and operating system of the foldable display device; meanwhile, there is no need to separately provide electronic devices, such as driving chips and circuit boards occupying a certain thickness of the whole machine for the secondary screen, which reduces the thickness of the foldable display device and is beneficial to realize the lightness and thinness of the whole machine.

Optionally, the protective plate 33 is made of transparent material, such as transparent glass. Thus, the area of the second bending display area 14 covered by the protective plate 33 also can display, which is beneficial to increase the overall screen-to-body ratio of the flexible display panel 1.

The protective plate 33 comprises a first lap jointing end surface 331 and a second lap jointing end surface 332 that are arranged oppositely, and the first lap jointing end surface 331 is located on a side of the protective plate 33 close to the second display area 12 for lap jointing the first cover plate 5 of the foldable display device; the second lap jointing end surface 332 is located on a side of the protective plate 33 close to the third display area 13 for lap jointing the second cover plate 6 of the foldable display device.

Figure 7:
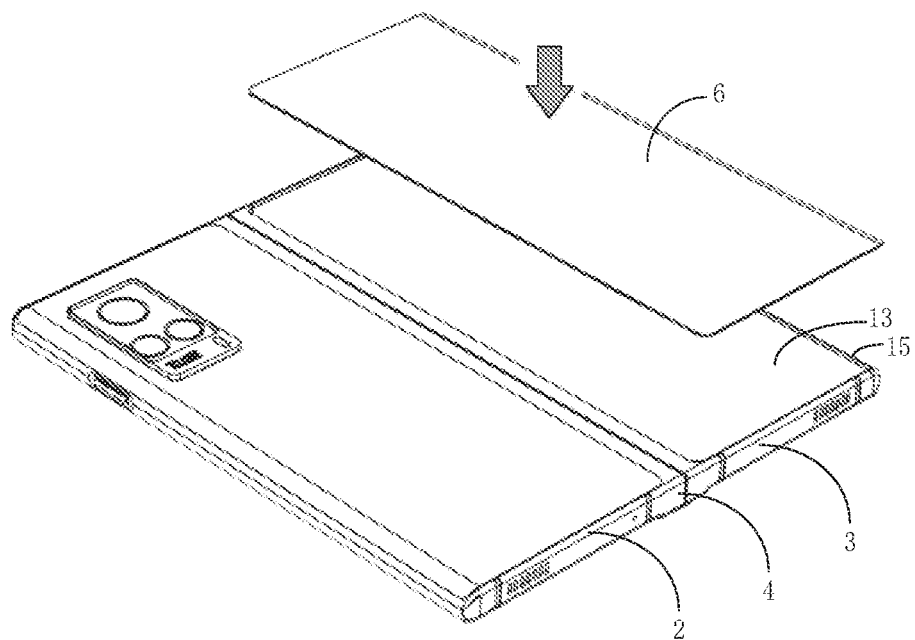
FIG. 7 is an installation diagram of a second cover plate provided by an embodiment of the present application.

Please combine FIG. 1, FIG. 6 and FIG. 7. FIG. 7 is an installation diagram of a second cover plate provided by an embodiment of the present application.

The first cover plate 5 covers the first display area 11, the second display area 12 and a part of the second bending display area 15 (the area of the main bending display area 151 that is not shielded by the protective plate 33), and is employed to protect the main screen of the flexible display panel 1; the second cover plate 6 covers the third display area 13 and a part of the second bending display area 15 (the area of the auxiliary bending display area 152 that is not shielded by the protective plate 33), and is employed to protect the secondary screen of the flexible display panel 1.

The first cover plate 5 is lap jointed with the first lap jointing end surface 331, so that the first cover plate 5 is easier to be fixedly installed on the second support plate 3. The second cover plate 6 is lap jointed with the second lap jointing end surface 332, so that the second cover plate 6 is easier to be fixedly installed on the second support plate 3. It is beneficial to improve the installation reliability of the first cover plate 5 and the second cover plate 6.

Optionally, between the first cover plate 5 and the first lap jointing end surface 331, and between the second cover plate 6 and the second lap jointing end surface 332, the lap jointing can be achieved by adhesive bonding. Specifically, double side adhesives can be respectively arranged between the first cover plate 5 and the first lap jointing end surface 331 and between the second cover plate 6 and the second lap jointing end surface 332. The double side adhesive can be an optical adhesive.

Specifically, the first cover plate 5 and the first lap jointing end surface 331, the second cover plate 6 and the second lap jointing end surface 332 can be directly adhered by machine bonding or manual bonding.

Optionally, the lap jointing may also be realized by mechanical connection, such as rivet fixation and threaded connection, between the first cover plate 5 and the first lap jointing end surface 331 and between the second cover plate 6 and the second lap jointing end surface 332.

Furthermore, the first cover plate 5 comprises a first flat cover plate 51 and a first curved cover plate 52 that are connected to each other, and the first flat cover plate 51 covers the first display area 11 and the second display area 12, and the first curved cover plate 52 covers the part of the second bending display area 15; the second cover 6 comprises a second flat cover plate 61 and a second curved cover plate 62 that are connected to each other, the second flat cover plate 61 covers the third display area 13, and the second curved cover plate 62 covers the part of the second curved cover plate 15; wherein the first curved cover plate 52 is lap jointed with the first lap jointing end surface 331 and the second curved cover plate 62 is lap jointed with the second lap jointing end surface 332.

Please refer to FIG. 1, the foldable display device further comprises a front frame 7, and the front frame 7 is arranged on a side of the flexible display panel 1 away from the first support plate 2 and the second support plate 3 and covers at least a part of a side surface of the flexible display panel 1.

The front frame 7 may be an assembled front frame. Specifically, the front frame 7 comprises a first front frame 71 and a second front frame 72. The first front frame 71 is arranged corresponding to the first display area 11. The second front frame 72 is arranged corresponding to the second display area 12 and the second bending display area 15. The first front frame 71 is connected to the first support plate 2, and the second front frame 72 is connected to the second support plate 3.

The second front frame 72 comprises a front part 721 and a side part 722, and the front part 721 is arranged corresponding to the second display area 12, and the side part 722 is arranged corresponding to the second bending display area 15. The front part 721 is connected to the second support plate 3. Specifically, the front part 721 is connected to the second side frame 3b. The side part 722 is connected to the first extension part 36 and the second extension part 37, and the side part 722 is a curved surface.

Figure 8:
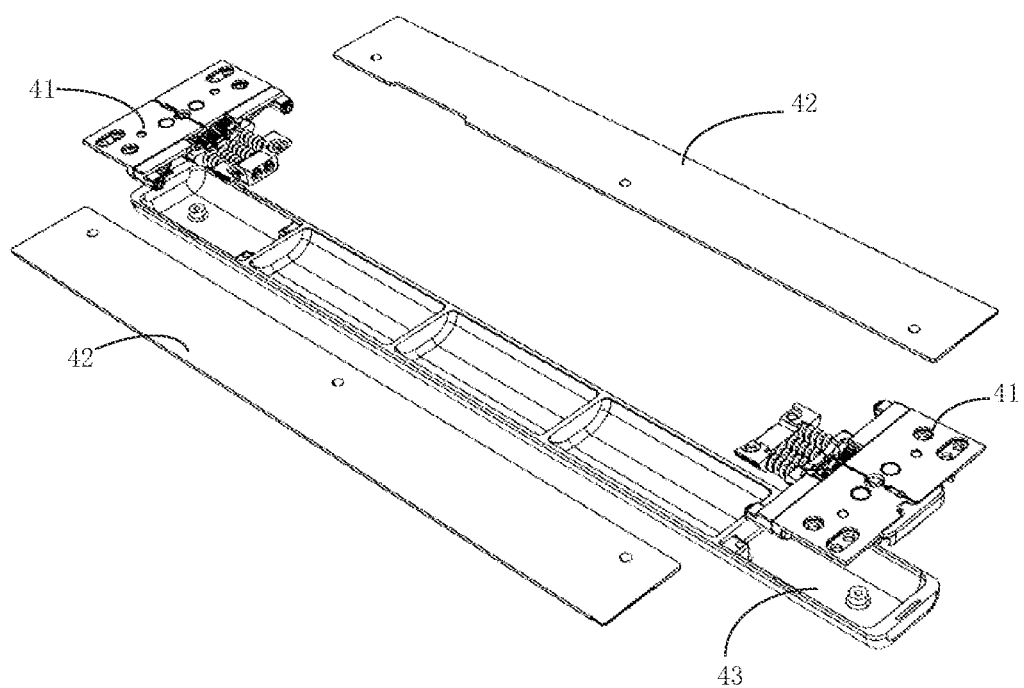
FIG. 8 is a structural diagram of a bending member provided by an embodiment of the present application.

Please combine FIG. 1 and FIG. 8. FIG. 8 is a structural diagram of a bending member provided by an embodiment of the present application. The bending member 4 comprises a hinge mechanism 41, two side plates 42 and a bottom plate 43, and the two side plates 42 and the bottom plate 43 are employed to protect the hinge mechanism 41. The two side plates 42 and the bottom plate 43 are respectively connected with the hinge mechanism 41; the two side plates 42 are respectively located on both sides of the hinge mechanism 41, and the bottom plate 43 is located on a side of the hinge mechanism 41 away from the flexible display panel 1.

Certainly, the bending member 4 may also adopt other types of bendable mechanisms, and the embodiment of the present application is not limited thereto.

The benefits are: the foldable display device provided by the embodiment of the present application comprises a first support plate, a second support plate, a bending member and a flexible display panel. The first support plate and the second support plate are rotatably connected by the bending member such that the flexible display panel can be dynamically bent in the form of inward folding through the bending member; the second support plate comprises a flat support part, a curved support part and a protective plate. One end of the flexible display panel wraps around the curved support part and extends to an other side of the second support plate such that the flexible display panel can achieve static bending in the form of outward folding for realizing the curved edge display; meanwhile, the flexible display panel penetrates the gap between the protective plate and the curved support part to protect the flexible display panel laid on the curved support part and to avoid that the flexible display panel is directly exposed to the outside and increases the risk of scratches and wear.

In summary, although the above preferred embodiments of the present application are disclosed, the foregoing preferred embodiments are not intended to limit the invention, those skilled in the art can make various kinds of alterations and modifications without departing from the spirit and scope of the present application. Thus, the scope of protection of the present application is defined by the scope of the claims.

What is claimed is:

1. A foldable display device, comprising:
   a first support plate;
   a second support plate, comprising a flat support part, a curved support part and a protective plate, and the curved support part is located at an end of the flat support part away from the first support plate and connected to the flat support part; and the protective plate is located at an end of the curved support part away from the first support plate, and the protective plate and the curved support part have a gap left inbetween and are connected to each other, and an orthographic projection of the protective plate on the curved support part covers a bending axis of the curved support part, and the protective plate is made of transparent material;
   a bending member, and the first support plate and the second support plate are rotatably connected by the bending member;

a flexible display panel, laid on one side of the first support plate, the second support plate and the bending member, and one end of the flexible display panel wraps around the curved support part and extends to an other side of the second support plate, and the flexible display panel penetrates the gap;

wherein the second support plate further comprises a first extension part and a second extension part for connecting the curved support part and the protective plate, and the first extension part and the second extension part are formed by extending the flat support part in a direction away from the first support plate; wherein one end of the protective plate is connected to the first extension part, and an other end of the protective plate is connected to the second extension part; and wherein the foldable display device further comprises a front frame, and the front frame is arranged on a side of the flexible display panel away from the first support plate and the second support plate and covers at least a part of a side surface of the flexible display panel, and the front frame comprises a first front frame and a second front frame, and the first front frame is connected to the first support plate, and the second front frame is connected to the second support plate, and the second front frame comprises a front part and a side part, and the front part is connected to the second support plate, the side part is connected to the first extension part and the second extension part, and the side part is a curved surface.

2. The foldable display device according to claim 1, wherein in a direction perpendicular to a plane of the first support plate, a cross-sectional shape of the curved support part is an arc, and a cross-sectional area of the protective plate is ⅕ to ⅙ of a circle area of the cross-sectional shape of the curved support part.

3. The foldable display device according to claim 1, wherein the first extension part, the second extension part and the protective plate are integrally formed with the flat support part.

4. The foldable display device according to claim 1, wherein the flexible display panel comprises:
a first display area, laid on the one side of the first support plate;
a second display area, laid on the one side of the flat support part;
a first bending display area, laid on the one side of the bending member;
a third display area, laid on one side of the second support plate away from the second display area; and
a second bending display area, laid on the curved support part and fixedly connected to the curved support part.

5. The foldable display device according to claim 4, wherein the protective plate comprises a first lap jointing end surface and a second lap jointing end surface that are arranged oppositely, and the first lap jointing end surface is located on a side of the protective plate close to the second display area, and the second lap jointing end surface is located on a side of the protective plate close to the third display area;
the foldable display device further comprises a first cover plate and a second cover plate, and the first cover plate covers the first display area, the second display area and a part of the second bending display area, and the second cover plate covers the third display area and a part of the second bending display area, and the first cover plate is lap jointed with the first lap jointing end surface and the second cover plate is lap jointed with the second lap jointing end surface.

6. A foldable display device, comprising:
a first support plate;
a second support plate, comprising a flat support part, a curved support part and a protective plate, and the curved support part is located at an end of the flat support part away from the first support plate and connected to the flat support part; and the protective plate is located at an end of the curved support part away from the first support plate, and the protective plate and the curved support part have a gap left inbetween and are connected to each other;
a bending member, and the first support plate and the second support plate are rotatably connected by the bending member;
a flexible display panel, laid on one side of the first support plate, the second support plate and the bending member, and one end of the flexible display panel wraps around the curved support part and extends to an other side of the second support plate, and the flexible display panel penetrates the gap;
wherein the second support plate further comprises a first extension part and a second extension part for connecting the curved support part and the protective plate, and the first extension part and the second extension part are formed by extending the flat support part in a direction away from the first support plate; wherein one end of the protective plate is connected to the first extension part, and an other end of the protective plate is connected to the second extension part; and
wherein the foldable display device further comprises a front frame, and the front frame is arranged on a side of the flexible display panel away from the first support plate and the second support plate and covers at least a part of a side surface of the flexible display panel, and the front frame comprises a first front frame and a second front frame, and the first front frame is connected to the first support plate, and the second front frame is connected to the second support plate, and the second front frame comprises a front part and a side part, and the front part is connected to the second support plate, the side part is connected to the first extension part and the second extension part, and the side part is a curved surface.

7. The foldable display device according to claim 6, wherein an orthographic projection of the protective plate on the curved support part covers a bending axis of the curved support part.

8. The foldable display device according to claim 7, wherein in a direction perpendicular to a plane of the first support plate, a cross-sectional shape of the curved support part is an arc, and a cross-sectional area of the protective plate is ⅕ to ⅙ of a circle area of the cross-sectional shape of the curved support part.

9. The foldable display device according to claim 6, wherein the first extension part, the second extension part and the protective plate are integrally formed with the flat support part.

10. The foldable display device according to claim 6, wherein the protective plate is made of transparent material.

11. The foldable display device according to claim 6, wherein the flexible display panel comprises:
a first display area, laid on the one side of the first support plate;
a second display area, laid on the one side of the flat support part;

a first bending display area, laid on the one side of the bending member;

a third display area, laid on one side of the second support plate away from the second display area; and a second bending display area, laid on the curved support part and fixedly connected to the curved support part.

12. The foldable display device according to claim 11, wherein the protective plate comprises a first lap jointing end surface and a second lap jointing end surface that are arranged oppositely, and the first lap jointing end surface is located on a side of the protective plate close to the second display area, and the second lap jointing end surface is located on a side of the protective plate close to the third display area;

the foldable display device further comprises a first cover plate and a second cover plate, and the first cover plate covers the first display area, the second display area and a part of the second bending display area, and the second cover plate covers the third display area and a part of the second bending display area, and the first cover plate is lap jointed with the first lap jointing end surface and the second cover plate is lap jointed with the second lap jointing end surface.

13. The foldable display device according to claim 12, wherein the first cover plate comprises a first flat cover plate and a first curved cover plate that are connected to each other, and the first flat cover plate covers the first display area and the second display area, and the first curved cover plate covers the part of the second bending display area; the second cover comprises a second flat cover plate and a second curved cover plate that are connected to each other, the second flat cover plate covers the third display area, and the second curved cover plate covers the part of the second curved cover plate;

wherein the first curved cover plate is lap jointed with the first lap jointing end surface and the second curved cover plate is lap jointed with the second lap jointing end surface.

14. The foldable display device according to claim 11, wherein when the foldable display device is in a folded state, the first display area, the second display area and the first bending display area are enclosed in a wedge shape, and the second display area, the third display area and the second bending display area are enclosed in a U shape.

15. The foldable display device according to claim 6, wherein the bending member comprises a hinge mechanism, two side plates and a bottom plate, and the two side plates and the bottom plate are respectively connected with the hinge mechanism; the two side plates are respectively located on both sides of the hinge mechanism, and the bottom plate is located on a side of the hinge mechanism away from the flexible display panel.

16. The foldable display device according to claim 6, wherein the second support plate comprises a first side frame, a second side frame, a third side frame and a fourth side frame that are connected end to end, and the first side frame and the third side frame are arranged opposite to each other, and the second side frame and the fourth side frame are arranged opposite to each other; the first side frame forms the curved support part, and the second side frame, the third side frame and the fourth side frame enclose to form the flat support part.

* * * * *